Patented July 15, 1952

2,603,652

UNITED STATES PATENT OFFICE 2,603,652

CYCLOPENTENOLONE ESTERS OF CYCLOPROPANE CARBOXYLIC ACIDS

Milton S. Schechter, Washington, D. C., and Frederick B. La Forge, Arlington, Va., dedicated to the free use of the People in the territory of the United States No Drawing. Application May 11, 1950, Serial No. 161,481

7 Claims. (Cl. 260—468)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

Since the publication of the results of the investigations of Staudinger and Ruzicka on the active principles of pyrethrum flowers [Helv. Chim. Acta, 7, 177-259, 377-458 (1924)], considerable work was done to revise and correct the structures which they proposed. The present invention relates to the synthesis of esters closely related to the pyrethrins and having their characteristic insecticidal properties. This invention also relates to the synthesis of cyclopentenolones and to hydroxydiketones which can be cyclized to cyclopentenolones. Certain esters of some of these new cyclopentenolones are comparable or superior to the pyrethrins and cinerins in insecticidal activity.

The hydroxydiketones prepared according to this invention are for Formula I, shown below. The cyclopentenolones of Formula II are produced by the cyclization of the hydroxydiketones.

R may be a hydrocarbon radical or substituted hydrocarbon radical such as alkyl, for example, methyl, ethyl, propyl, iso-propyl, n-butyl, secondary butyl, tertiary butyl, n-amyl, secondary and tertiary amyl, n-hexyl and isomers, heptyl, octyl, nonyl, dodecyl, octadecyl, and substituted alkyl, alkenyl such as allyl, 2-methylallyl, vinyl, and 2- or 3-butenyl, substituted alkenyl such as 2- or 3-chloroallyl, alkynyl such as 2-propynyl, alkadienyl, such as 2,4-pentadienyl, alkatrienyl, aryl such as phenyl and napthyl, alkylaryl such as xylyl, aralkyl such as benzyl and phenylethyl, aralkenyl such as cinnamyl, cycloalkyl such as cyclopropyl, cyclohexyl and cyclopentyl, and cycloalkenyl such as cyclopentadienyl or cyclohexenyl. R may also be a heterocyclic radical such as furfuryl or thenyl.

R' may be alkyl such as methyl, ethyl, propyl, iso-propyl, butyl, secondary and tertiary butyl, pentyl and isomers, octyl, decyl, and heptadecyl, substituted alkyl, alkenyl or substituted alkenyl, aryl such as phenyl, methyl phenyl, xylyl, substituted aryl, aralkyl such as benzyl and phenylethyl, aralkenyl such as styryl, and cycloalkyl such as cyclohexyl and cyclopentyl.

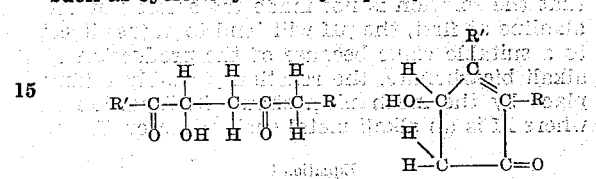

Formula I     Formula II

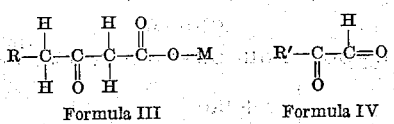

Formula III     Formula IV

There is a great variety of radicals which anyone skilled in the art may utilize as R and R'. Thus, R can originate from any compound of the type R—CH₂—CO—CH₂—COO—M, Formula III (where M is an alkali metal such as sodium or potassium). R' can originate from any compound of the type R'—CO—CHO, Formula IV.

The reactants for preparing the hydroxydiketones are the alkali salts of beta-keto acids of the type R—CH₂—CO—CH₂—COO—M (Formula III) and the substituted glyoxals of the type R'—CO—CHO (Formula IV). The substituted glyoxals may be prepared by many different methods known to those skilled in the art, one such convenient method being the oxidation of methyl ketones, R'—CO—CH₃, or aldehydes having an alpha methylene group,

R'—CH₂—CHO by selenium dioxide. Thus, acetone may be oxidized to pyruvaldehyde, $CH_3$—CO—CHO, and acetophenone to phenylglyoxal, $$C_6H_5-CO-CHO$$

The alkali salts of beta-keto acids may be prepared by saponification of the corresponding beta-keto esters at room temperature or lower by means of aqueous solutions of alkali hydroxides. Any excess alkali left at the end of the saponification may be neutralized with acid or by bubbling carbon dioxide into the solution. Certain beta-keto acids which are sufficiently stable, such as beta-oxocaprylic acid, may be isolated as such, stored at low temperature, and neutralized with cold aqueous alkali when ready to be used.

The synthesis of compounds of the type shown in Formula I consists in reacting, in substantially equi-molecular quantities, at room temperature or below, a substituted glyoxal of the type shown in Formula IV with a beta-keto acid of the type shown in Formula III (M=hydrogen) or with one of its alkali salts (Formula III, M=sodium or potassium), the pH of the solution preferably being kept between about pH 5 to about pH 9. It is inadvisable to have the solution too alkaline or too acidic. If it is too alkaline some of the substituted glyoxal may rearrange to a hydroxy acid, whereas if it is too acidic, some of the beta-keto acid may decompose; in either case, the yields of desired product will be lowered. To maintain the pH within desired limits, the reaction may be carried out in the presence of buffers, or else acid or alkali may be added as the reaction proceeds. The substituted glyoxal may be used pure or in solution. If the substituted glyoxal is only moderately soluble in water, such as phenylglyoxal, the reaction mixture may be agitated or a co-solvent such as alcohol may be added. Provided that the solution is not made too acidic nor too alkaline at first, the pH will tend to adjust itself to a suitable value because of the production of alkali bicarbonate, the reaction probably taking place by the mechanism shown in Equation 1, where M is an alkali metal such as Na or K.

Equation 1

R′—CO—CHO + R—CH$_2$—CO—CH$_2$—COO—M ⟶

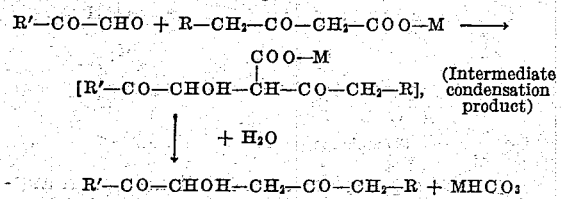

That the intermediate condensation product (not isolated) of Equation 1 decarboxylates spontaneously is evident for several reasons. Firstly, in those cases where R is large enough to render the hydroxydiketone difficultly soluble in water (for example where R is butyl), the hydroxydiketone separates out of the reaction mixture as an oil during the progress of the reaction. Secondly, when the reaction is run under alkaline conditions, the hydroxydiketone may be extracted directly from the reaction mixture which is still faintly alkaline at the end of the reaction. Thirdly, when the reaction is run under alkaline conditions, after having extracted the hydroxydiketone, a titration of the remaining extracted liquid for alkali bicarbonate indicates that practically the theoretical amount is produced.

If, by means of buffers or by the addition of acid, the reaction is run under acidic conditions, the formation of the intermediate condensation product takes place as shown in Equation 1, where M is now hydrogen rather than an alkali metal, and the carbon dioxide resulting from the decarboxylation of the intermediate condensation product is liberated as a gas instead of appearing as alkali bicarbonate.

The mechanisms proposed above are not to be considered as limiting the invention in any way since the reactions may actually take place in a different manner.

The reactions are usually substantially complete in about six hours at room temperature but may be allowed to proceed for a longer period. The hydroxydiketones may be separated from the reaction mixtures, dried, and distilled in vacuo, or they may be extracted with a solvent such as ether. The ether solution is then washed, dried, and the ether evaporated, the residue being subjected to distillation in high vacuum. The yields usually are from about 50% to 75% of the theory. Whereas we prefer aqueous or aqueous-alcoholic solutions, it is within the scope of this invention to carry out the preparation of the hydroxydiketones in organic solvents. Specific examples of the preparation of hydroxydiketones of the type illustrated in Formula I will be described in the experimental section.

The cyclopentenolones are prepared by the cyclization of the hydroxydiketones in a suitable alkaline medium. When the hydroxydiketones are treated with aqueous or aqueous-alcoholic solutions of alkaline cyclizing agents such as sodium hydroxide, potassium hydroxide, barium hydroxide, piperidine or quaternary ammonium hydroxides, water is eliminated intramolecularly and the hydroxydiketones are converted to cyclopentenolones as shown in Equation 2. The employment of 10 to 20 volumes of a 1 to 10% aqueous sodium hydroxide solution has proved to be quite satisfactory. Although it is preferable to use the distilled hydroxydiketones, it is possible to employ the crude, undistilled products. Whereas we prefer aqueous or aqueous-alcoholic solutions, it is within the scope of this invention to carry out the cyclizations in organic solvents.

Equation 2

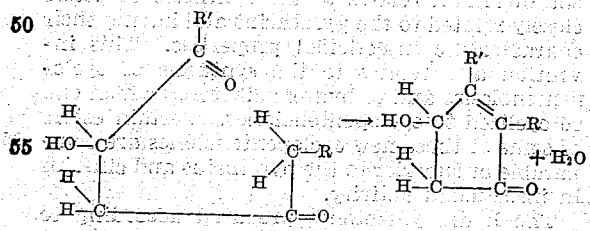

The beta-keto esters listed in table I below were prepared employing the general procedures described by Soloway and La Forge, J. Am. Chem. Soc., 69, 2677 (1947), Green and La Forge, J. Am. Chem. Soc., 70, 2287 (1948), and Wallingford, Homeyer and Jones, J. Am. Chem. Soc., 63, 2252 (1941), except for methyl 3-oxo-7-octenoate, which was prepared by the method of Harper, J. Chem. Soc., 892 (1946).

Several beta-keto acids were prepared by saponification of the corresponding esters with a slight excess of a 5 to 10% aqueous potassium hydroxide solution at about 5° for three days. Upon acidification to Congo red with dilute sulfuric or hydrochloric acid, the free keto acids were obtained. Beta-oxocaprylic acid, M. P. 75-

76° (dec.) [c. f. Locquin, Bull. Soc. Chim. 31 (3), 597 (1904)], and 3-oxo-6-octenoic acid, M. P. 71–72° (dec.), were thus prepared. These acids are stable for months in the refrigerator but slowly decompose at room temperature with the liberation of carbon dioxide. 3-oxo-6-heptenoic acid was prepared in the same manner but was isolated as an oil which crystallizes on cooling with Dry Ice and melts on warming to room temperature with slow decomposition.

Pyruvaldehyde was prepared from acetone and selenium dioxide by the general procedure of Riley and co-workers [J. Chem. Soc. 1875 (1932); 621 (1938)]. Phenylglyoxal hydrate was prepared according to "Organic Synthesis," Collective vol. II, p. 509 (1943), John Wiley and Sons, Inc., New York, N. Y. The pyruvaldehyde was assayed by the methods of Friedemann, J. Biol Chem., 73, 331 (1927) and Simon and Neuberg, Biochem. Zeit., 232, 479 (1931).

The procedures used by us in the preparation of the hydroxydiketones of Formula I are as follows:

*Procedure A.*—The beta-keto acid was isolated as described above, mixed with ice-cold water and exactly neutralized with cold 10% sodium hydroxide solution. The pyruvaldehyde, usually dissolved in a little water, was added and the alkalinity adjusted to approximately pH 8. It is immaterial if the pyruvaldehyde has polymerized during storage in the refrigerator since it either dissociates on standing in dilute aqueous solution or else a shift of equilibrium to the monomer occurs as it reacts. When phenylglyoxal hydrate, which is not very soluble in water, was employed, the reaction mixture was shaken or stirred.

If the reaction medium is too alkaline, some of the substituted glyoxal may be converted to a hydroxy acid before it can react with the salt of the beta-keto acid. In those cases where the hydroxydiketones are insoluble, the reaction mixture turns cloudy in about two hours and the oily reaction product separates practically completely during several more hours. The lower molecular weight hydroxydiketones may separate partially or not at all depending on their solubility and the volume of the reaction mixture. In these cases, the solutions were saturated with sodium chloride before extraction.

After a period of about sixteen hours to several days, the reaction mixture was extracted with peroxide-free ether. The ether solution was washed with saturated salt solution and after drying over sodium sulfate, the solvent was removed and the residue distilled in high vacuum. There was little or no forerun, but there was usually a fraction, not further investigated, having a considerably higher boiling point than the desired compound.

*Procedure B.*—This is the same as Procedure A except that the beta-keto ester was saponified with a slight excess of a 5 to 20% potassium hydroxide solution for several days in the refrigerator. The excess alkali was neutralized with dilute sulfuric acid, the substituted glyoxal added, and the alkalinity adjusted to approximately pH 8.

*Procedure C.*—This is the same as Procedure B except that instead of neutralizing the alkaline solution of the beta-keto acid with dilute sulfuric acid, the solution was saturated with carbon dioxide using a porous disperser. The excess alkali is thereby converted to bicarbonate giving a suitable pH and the substituted glyoxal may be added without further adjustment of the alkalinity.

A number of hydroxydiketones of the type illustrated in Formula I, were prepared by these general procedures. Table II sets forth a number of hydroxydiketones prepared by one of Procedures A, B, or C, and the reaction conditions, and physical constants of the hydroxydiketones. Table III presents the analytical data on the hydroxydiketones and their semicarbazone derivatives (prepared in pyridine-ethanol solution). The analyses of the semicarbazone derivatives indicated that water had been eliminated so that they are either anhydrodisemicarbazones or pyrazoline derivatives. The anhydrodisemicarbazones can be obtained in low- and high-melting forms depending on the solvent used for recrystallization.

Typical experiments describing the preparation of hydroxydiketones and some variations which may be employed follow:

*3-hydroxy-2,5-decanedione* (Table II, compound A).—Procedure A was used. Thirty grams of beta-oxocaprylic acid (0.19 mole) mixed with 50 ml. of cold water in a glass stoppered flask was kept cold in an ice bath and titrated with 10% sodium hydroxide solution until just alkaline to phenolphthalein. The stoppered flask was shaken vigorously near the end of the titration. Eighteen grams of pyruvaldehyde (87.6% assay) (0.22 mole) was added and rinsed in with a little water. The alkalinity of the reaction mixture was adjusted to approximately pH 8 using a pH test paper, by the careful addition of a little 10% sodium hydroxide solution. The total volume of the reaction mixture was 200 ml. In about two hours at room temperature, the solution turned milky and the oily reaction product which was forming rose to the surface. After two days, the reaction mixture was still faintly alkaline. It was extracted several times with ether, the extracts were combined and washed several times with saturated sodium chloride solution and after drying the extract over anhydrous sodium sulfate, the ether was distilled off leaving a residue of 32 g. of yellow oil which was distilled in vacuo. After a small forerun, the main fraction was collected at 89–95° (0.05 mm.), most of it distilling at 93–95°, $n_D^{25}$ 1.4514; yield 23 g. (65%). There was also a higher boiling fraction, B. P. 150–155° at 0.15 mm., which was not investigated.

An aliquot of the reaction mixture, after it had been extracted by ether, was titrated for sodium bicarbonate using 1 N sulfuric acid solution and methyl orange indicator, the solution being boiled near the end of the titration. The theoretical amount of sodium bicarbonate was found.

A similar experiment was performed starting with beta-oxocaprylic acid and pure pyruvaldehyde-sodium bisulfite compound (instead of pyruvaldehyde) with final adjustment of the alkalinity to approximately pH 8. After standing for two days, very little oil separated. The reaction mixture was acidified to Congo red with dilute sulfuric acid (1:4) and heated for 15 min. on the steam bath under a reflux condenser in order to decompose any bisulfite addition compounds. The product was isolated as usual by extraction with ether and distillation in vacuo, giving only a 19% yield of 3-hydroxy-2,5-decanedione.

Another experiment was run using commercially available pyruvaldehyde. This product was supplied as an approximately 30% aqueous solution but it was noted that it contained formaldehyde, acidic substances, and other unknown impurities. Procedure B was used. Ninety-nine grams (0.53 mole) of ethyl beta-oxocaprylate was mixed with 195 ml. of an ice-cold solution containing 39 g. of potassium hydroxide (86% assay) (0.60 mole). After standing for three days in the refrigerator, the excess alkali was approximately neutralized by the slow addition of dilute sulfuric acid (1:4). One hundred and forty grams of commercial pyruvaldehyde (30%) (0.58 mole) was added and the solution adjusted to approximately pH 7.5–8 by the addition of 10% potassium hydroxide solution. The total volume of the reaction mixture was 537 ml. In ninety minutes, the reaction product began to separate as an oil which floated to the surface. After four hours, 104 ml. had separated after which there was no further increase. The next day the product was isolated in the usual manner by extraction with ether and distillation to yield, after a small forerun, 50.9 g. (52%) B. P. 105–110° at 0.4 mm., $n_D^{25}$ 1.4532. Redistillation gave 41.7 g., B. P. 90–98° at 0.05 mm., $n_D^{25}$ 1.4528.

To illustrate that the reaction can be run under acidic conditions, a solution of sodium beta-oxocaprylate (0.05 mole) was reacted with pyruvaldehyde in the presence of a buffer consisting of a solution of citric acid (0.1 mole) partly neutralized with sodium hydroxide. The initial pH of the reaction mixture was 4.9 and the reaction was allowed to proceed for 24 hours during which time carbon dioxide was evolved and the reaction product separated as an oil, the final pH being 5.1. Extraction and distillation of the product in the usual manner yielded 5.5 g. (59%) of 3-hydroxy-2,5-decanedione.

*3-hydroxy-8-nonene-2,5-dione (Table II, compound C).*—In addition to preparing this compound in the usual manner by Procedure A from 3-oxo-6-heptenoic acid and pyruvaldehyde (see Table II, compound C) it was also prepared using pyruvaldehyde diethyl acetal as a source of pyruvaldehyde.

Seventeen and a half grams (0.12 mole) of pyruvaldehyde diethyl acetal was refluxed for one hour with 1.6 g. of concentrated sulfuric acid in 60 ml. of water. The solution was cooled in an ice bath and neutralized by the slow addition of about 3 g. of sodium bicarbonate. Procedure C was used. Starting with 17 g. (010 mole) of ethyl 3-oxo-6-heptenoate, saponified at 5° for several days with 7.1 g. of potassium hydroxide (87.5% assay) (0.11 mole) in 80 ml. of water, and the hydrolyzed pyruvaldehyde diethyl acetal solution, the reaction time being two days, 10.6 g. (62% yield) of distilled product was obtained, $n_D^{25}$ 1.4660.

Treatment of the hydroxydiketones with acetic anhydride and anhydrous sodium acetate led to the formation of anhydro compounds of the type illustrated in Formula V. The disemicarbazones of these seem to be identical with the anhydro-disemicarbazones of the corresponding hydroxydiketones as proved by their analyses and mixed melting points. The analytical data on the anhydro compounds and their disemicarbazones are presented in Table IV.

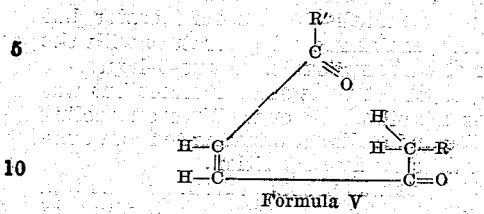

Formula V

The anhydro compounds prepared were 3-decene-2,5-dione; 3,8-decadiene-2,5-dione; 3,8-nonadiene-2,5-dione; 3,9-decadiene-2,5-dione; from the corresponding hydroxydiketones.

The procedure for cyclizing the hydroxydiketones to cyclopentenolones is as follows: The hydroxydiketone was placed in a glass-stoppered Erlenmeyer flask or bottle and 10 to 20 volumes of 1 to 10% sodium hydroxide solution was added. Although other alkaline cyclizing agents such as potassium hydroxide, barium hydroxide, quaternary ammonium hydroxides, and piperidine can be used, sodium hydroxide was found to give uniformly good yields and was generally employed. The air was displaced with nitrogen and the slightly lubricated stopper inserted. If further precautions against oxidation are desired, boiled water may be used in making up the alkali solution, and a small amount of hydroquinone may be added to the reaction mixture. It was then shaken for one to four hours on a shaking machine, occasionally somewhat longer. The reaction mixture turns yellow as soon as the alkali is added and usually becomes darker as the reaction proceeds. After extraction with peroxide-free ether (in the case of the lower molecular weight cyclopentenolones, after saturation with salt), the extract was washed several times with saturated salt solution and after drying over sodium sulfate, the solvent was removed and the residue distilled in high vacuum. Sometimes there was a small forerun (probably uncyclized hydroxydiketone). In each case, as in the distillation of the hydroxydiketones, there was a fraction, not further investigated, boiling considerably higher than the desired compound.

Table V presents the cyclopentenolones of Formula II which were prepared. The compound 3-hydroxy-2,5-hexanedione, Henze's ketol (Table II, compound H), could not be cyclized by alkali; it yielded, instead, a complex mixture of products. The analytical data on the cyclopentenolones and their semicarbazones are presented in Table VI. The cyclopentenolones are the dl or racemic compounds which may be resolved by conventional means to yield the optically active d and l forms.

TABLE I

BETA-KETO ESTERS

| | | Boiling point ° C. | Pressure mm. | Refractive index $n_D$ |
|---|---|---|---|---|
| A. | Ethyl beta-oxocaprylate | 108–112 | 11 | 1.4326(25°) |
| B. | Ethyl 3-oxo-6-octenoate | 110–120 | 10 | 1.4460(25°) |
| C. | Ethyl 3-oxo-6-heptenoate | 107–111 | 14 | 1.4393(28°) |
| D. | Ethyl 6-methyl-3-oxo-6-heptenoate | 119–125 | 16 | 1.4468(27°) |
| E. | Methyl 3-oxo-7-octenoate | 114–122 | 16 | 1.4500(25°) |
| F. | Ethyl 7-methyl-3-oxo-6-octenoate | 135–136 | 15 | 1.4519(25°) |

TABLE II

Hydroxydiketones of the Type Illustrated in Formula I

| Product, R | Formula I R' | Procedure | Starting ester [1] grams | Starting ester [1] Table I | Pyruvaldehyde grams | Pyruvaldehyde Per cent assay | Reaction volume ml. | Time hours | Distilled Product Yield grams | Distilled Product Yield Per cent of theory | Boiling point °C. | Boiling point mm. | $n_D^{25}$ |
|---|---|---|---|---|---|---|---|---|---|---|---|---|---|
| A. —n—$C_4H_9$ | —$CH_3$ | A | 30 | A | 18 | 87.6 | 200 | 48 | 23 | 65 | 89–95 | 0.05 | 1.4514 |
| B. —$CH_2CH=CHCH_3$ | —$CH_3$ | A | 50.4 | B | 29.5 | 90 | 290 | 72 | 44.7 | 75 | 97–100 | 0.1 | 1.4679 |
| C. —$CH_2CH=CH_2$ | —$CH_3$ | A | 50 | C | 32.2 | 90 | 270 | 72 | 35 | 58 | 85–90 | 0.07 | 1.4657 |
| D. —$CH_2C(CH_3)=CH_2$ | —$CH_3$ | C | 44 | D | 24 | 76 | 254 | 24 | 25.7 | 58 | 98–102 | 0.3 | 1.4687 |
| E. —$CH_2CH_2CH=CH_2$ | —$CH_3$ | C | 50 | E | 32.2 | 72.4 | 255 | 16 | 38.4 | 77 | 94–97 | 0.2 | 1.4675 |
| F. —$CH_2CH=C(CH_3)_2$ | —$CH_3$ | C | 47.5 | F | 25 | 76 | 300 | 24 | 32.2 | 68 | 106–109 | 0.5 | 1.4715 |
| G. —$CH_2CH=CH_2$ | —$C_6H_5$ | B | 28 | C | [2] 22.5 | | 210 | 24 | 23.3 | 68 | [3] 154–157 | 0.8 | |
| H. —H | —$CH_3$ | C | [4] 65 | | 41.4 | 88.6 | | 72 | [5] 24.1 | 37 | 62–67 | 0.5 | 1.4497 |

[1] See Table I for the esters; where Procedure A was used, the weight refers to the beta-keto acid, not the ester.
[2] Phenylglyoxal hydrate.
[3] This compound could be crystallized, m. p. 38.5–39° (ether-petroleum ether).
[4] Ethyl acetoacetate.
[5] Product was extracted with ether in a continuous extractor from the sodium chloride-saturated reaction mixture.

TABLE III

Hydroxydiketones and Their Anhydrodisemicarbazones

| Compound [1] | Formula | Analysis Per cent Calculated C | Analysis Per cent Calculated H | Analysis Per cent Found C | Analysis Per cent Found H | Anhydrodisemicarbazone M. P. °C. cor. | Anhydrodisemicarbazone Formula | Analysis Per cent Calculated C | Analysis Per cent Calculated H | Analysis Per cent Found C | Analysis Per cent Found H |
|---|---|---|---|---|---|---|---|---|---|---|---|
| A | $C_{10}H_{18}O_3$ | 64.48 | 9.74 | 64.10 | 9.56 | [2] 224–225 | $C_{12}H_{22}O_2N_6$ | 51.04 | 7.86 | 50.62 | 7.65 |
| B | $C_{10}H_{16}O_3$ | 65.19 | 8.76 | 64.75 | 8.79 | [2] 227–228 | $C_{12}H_{20}O_2N_6$ | 51.41 | 7.19 | 51.47 | 7.02 |
| C | $C_9H_{14}O_3$ | 63.51 | 8.29 | 62.82 | 8.05 | [2] 228–229 | $C_{11}H_{18}O_2N_6$ | 49.61 | 6.81 | 49.65 | 6.85 |
| D | $C_{10}H_{16}O_3$ | 65.19 | 8.76 | 65.28 | 8.38 | [2] 225–226 | $C_{12}H_{20}O_2N_6$ | 51.41 | 7.19 | 50.76 | 6.80 |
| E | $C_{10}H_{16}O_3$ | 65.19 | 8.76 | 65.01 | 8.52 | [3] 220–221 [2] 214–215 | $C_{12}H_{20}O_2N_6$ | 51.41 | 7.19 | 51.70 | 6.98 |
| F | $C_{11}H_{18}O_3$ | 66.64 | 9.15 | 66.80 | 8.75 | [2] 238–239 | | | | | |
| G | $C_{14}H_{16}O_3$ | 72.39 | 6.94 | 72.56 | 6.85 | | | | | | |

[1] See Table II for the compounds.
[2] Recrystallized from acetic acid, melts with decomposition.
[3] Recrystallized from 95% ethanol, melts with decomposition.

TABLE IV

Compounds of Formula V and Their Disemicarbazones

| Compound, R | Formula V R' | M. P. °C. cor. | Formula | Analysis Per Cent Calculated C | Analysis Per Cent Calculated H | Analysis Per Cent Found C | Analysis Per Cent Found H | Disemicarbazone, M. P. °C. cor. |
|---|---|---|---|---|---|---|---|---|
| A. —n—$C_4H_9$ | —$CH_3$ | [1] 52–53 | $C_{10}H_{16}O_2$ | 71.39 | 9.59 | 71.27 | 9.44 | [2,3] 228–229 [4] 224–225 |
| B. —$CH_2CH=CHCH_3$ | —$CH_3$ | [1] 52–53 | $C_{10}H_{14}O_2$ | 72.26 | 8.49 | 71.74 | 8.35 | [2] 231–232 [4] 228–229 |
| C. —$CH_2CH=CH_2$ | —$CH_3$ | [5] oil | | | | | | [2] 220–221 [4] 214–215 |
| E. —$CH_2CH_2CH=CH_2$ | —$CH_3$ | [5] oil | | | | | | |

[1] Recrystallized from petroleum ether.
[2] Recrystallized from 95% ethanol, melts with decomposition.
[3] Anal., Calc'd. for $C_{12}H_{22}O_2N_6$: C, 51.04; H, 7.86. Found: C, 51.39; H, 7.94.
[4] Recrystallized from acetic acid, melts with decomposition.
[5] Crystallized in refrigerator, melts on warming.

TABLE V
Cyclopentenolones of Formula II

| Product, R | Formula H-R' | Hydroxydiketone used [1] | | Alkali used | | Time hours | Distilled product | | | | |
|---|---|---|---|---|---|---|---|---|---|---|---|
| | | | | | | | Yield | | Boiling point | | $n_D^{25}$ |
| | | grams | Table II | Per cent | ml. | | grams | Per cent of theory | °C. | mm. | |
| A.....—n—C₄H₉ | —CH₃ | 14 | A | 2 | 140 | 16 | 8.0 | 63 | 110–113 | 0.07 | [2] 1.4920 |
| B.....—CH₂CH=CHCH₃ | —CH₃ | [3] 25 | B | 1 | 500 | 1.5 | 14.0 | 62 | 110–114 | 0.15 | 1.5143 |
| C.....—CH₂CH=CH₂ | —CH₃ | 25 | C | 10 | 200 | 1 | 13.3 | 59 | 100–103 | 0.15 | 1.5141 |
| D.....—CH₂C(CH₃)=CH₂ | —CH₃ | 31.6 | D | 2 | 640 | 3 | 18.9 | 66 | 115–120 | 0.3 | [4] 1.5113 |
| E.....—CH₂CH=CH₂ | —CH₃ | [3] 15 | E | 2 | 225 | 3 | 6.4 | 47 | 109–113 | 0.2 | 1.5089 |
| F.....—CH₂CH=C(CH₃)₂ | —CH₃ | 25 | F | 2 | 375 | 4 | 13.0 | 57 | 116–119 | 0.3 | 1.5100 |
| G.....—CH₂CH=CH₂ | —C₆H₅ | 15 | G | 2 | 225 | 4 | 7.0 | 51 | 153–156 | 0.6 | [5] 1.5975 |

[1] See Table II for the hydroxydiketones used.
[2] Regeneration from the semicarbazone and distillation gave a product, B. P. 111–113° (0.2 mm.), $n_D^{25}$ 1.4945.
[3] The hydroxydiketone dissolved in a little ethanol was slowly dropped into the alkali with stirring in a nitrogen swept flask.
[4] Regeneration from the semicarbazone and distillation gave a product, B. P. 112–114° (0.3 mm.), $n_D^{25}$ 1.5120.
[5] When regenerated from the semicarbazone this compound crystallized, M. P. 97.5–98.5 (benzene-petroleum ether).

TABLE VI
Cyclopentenolones and Their Semicarbazones

| Compound [1] | Formula | Analysis | | | | Semicarbazone | | | | | |
|---|---|---|---|---|---|---|---|---|---|---|---|
| | | Per Cent calculated | | Per Cent found | | M. P., °C. cor. [2] | Formula | Per Cent calculated | | Per Cent found | |
| | | C | H | C | H | | | C | H | C | H |
| A | C₁₀H₁₆O₂ | 71.39 | 9.59 | [3] 71.10 | [3] 9.64 | 199–200 | C₁₁H₁₉O₂N₃ | 58.64 | 8.50 | 58.79 | 8.29 |
| B | C₁₀H₁₄O₂ | 72.26 | 8.49 | 71.75 | 8.40 | 222–223 | C₁₁H₁₇O₂N₃ | 59.17 | 7.68 | 59.29 | 7.51 |
| C | C₉H₁₂O₂ | 71.02 | 7.95 | 70.23 | 8.07 | 213–214 | C₁₀H₁₅O₂N₃ | 57.40 | 7.23 | 57.90 | 7.22 |
| D | C₁₀H₁₄O₂ | 72.26 | 8.49 | [3] 72.48 | [3] 8.18 | 213–214 | C₁₁H₁₇O₂N₃ | 59.17 | 7.68 | 59.29 | 7.53 |
| E | C₁₀H₁₄O₂ | 72.26 | 8.49 | 71.88 | 8.35 | 195–196 | C₁₁H₁₇O₂N₃ | 59.17 | 7.68 | 58.78 | 7.60 |
| F | C₁₁H₁₆O₂ | 73.29 | 8.95 | 73.44 | 8.71 | 222–223 | C₁₂H₁₉O₂N₃ | [4] 17.70 | | [4] 17.84 | |
| G | C₁₄H₁₄O₂ | 78.48 | 6.59 | [5] 78.49 | [5] 6.56 | [6] 212–213 | C₁₅H₁₇O₂N₃ | 66.40 | 6.32 | 66.43 | 6.37 |

[1] See Table V for the compounds.
[2] Recrystallized from methanol-ethyl acetate, melts with decomposition.
[3] Analysis on the compound regenerated from its semicarbazone and distilled.
[4] Per Cent Nitrogen.
[5] Analysis on crystalline compound, see Table V, footnote 5.
[6] Recrystallized from acetic acid, melts with decomposition.

The synthetic 2-(2-butenyl)-4-hydroxy-3-methyl-2-cyclopenten-1-one (Formula II,

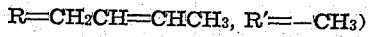
R=CH₂CH=CHCH₃, R'=—CH₃)

which we have prepared is not identical with natural dl-cinerolone which has been assigned the same structural formula [La Forge and Soloway, J. Am. Chem. Soc. 69, 2932 (1947)]. The two appear to be cis-trans or geometrical isomers. Mixtures of corresponding derivatives, show definite melting-point depressions. However, on hydrogenation, both of these cyclopentenolones yield the identical product, dl-dihydrocinerolone.

All of the substituted cyclopentenolones described herein in Table V have been esterified with natural d-trans-chrysanthemum monocarboxylic acid yielding esters analogous to cinerin I. In addition, two of them, Formula II, R'=—CH₃, R=—CH₂CH=CHCH₃ and Formula II,

R'=—CH₃, R=—CH₂CH=CH₂ have each been esterified with synthetic dl-cis- and dl-trans-chrysanthemum monocarboxylic acids. These esters were prepared by mixing a benzene solution of the chrysanthemum monocarboxylic acid chloride with a benzene solution of the cyclopentenolone containing a slight molecular excess of pyridine. After one day, ether was added and the ether solution was washed successively with water, dilute acid, dilute sodium bicarbonate solution, and then with saturated sodium chloride solution. After drying the ether solution, the solvent was removed in vacuum leaving the ester.

Table VII contains data on the toxicity of some esters of the new cyclopentenolones to houseflies and Tables VIII and IX give data on aerosol formulations containing the d-trans-chrysanthemum monocarboxylic acid ester of 2-allyl-4-hydroxy-3-methyl-2-cyclopenten-1-one (ester A of Tables VIII and IX) and the d-trans-chrysanthemum monocarboxylic acid ester of 4-hydroxy-3-methyl-2-(2-methylallyl)-2-cyclopenten-1-one (ester M of Tables VIII and IX).

In addition to the esters shown in Table VII, 2-allyl-4-hydroxy-3-methyl-2-cyclopenten-1-one has been esterified in the same way with the following acids (via the acid chlorides):

2-(1-methylvinyl)cyclopropanecarboxylic acid.
2-methyl-2-(1-methylvinyl)cyclopropanecarboxylic acid.
3-isobutyl-2,2-dimethylcyclopropanecarboxylic acid.
2-methyl-2-(3-methyl-3-butenyl)cyclopropanecarboxylic acid.
2,2-dimethyl-3-(1-methylpropenyl)cyclopropanecarboxylic acid.
dl-Chrysanthemum monocarboxylic acid, synthetic cis-trans mixture.

All of these esters exhibited toxicity and knockdown to houseflies.

The synthetic esters have certain advantages over pyrethrum extract, such as freedom from irritating impurities and freedom from insoluble impurities which cause clogging difficulties in formulations used for aerosol-type insecticides.

The insecticidal esters may be formulated in various ways known to those skilled in the art, for use as dusts, sprays, aerosols, emulsions, kerosene or organic solvent solutions, etc. They may, of course, also be used with synergists, or with other insecticides such as DDT, benzene hexachloride, rotenone, chlordane, etc.

TABLE VII

Toxicity of Cyclopentenolone Esters to Houseflies

| Cyclopentenolone used [1] | Acid used to prepare ester | Concentration of ester [2] mg./ml. | Knockdown 25 minutes Per cent | Per cent Mortality in 1 day |
|---|---|---|---|---|
| A | Natural d-trans-chrysanthemum monocarboxylic acid | 32 | 100 | 89 |
|   |   | 16 | 100 | 66 |
|   |   | 8 | 100 | 35 |
| B | Natural d-trans-chrysanthemum monocarboxylic acid | 4 | 100 | 74 |
|   |   | 2 | 100 | 62 |
|   |   | 1 | 100 | 37 |
| C | Natural d-trans-chrysanthemum monocarboxylic acid | 1 | 100 | 77 |
|   |   | 0.5 | 100 | 58 |
|   |   | 0.25 | 100 | 44 |
| D | Natural d-trans-chrysanthemum monocarboxylic acid | 2 | 100 | 78 |
|   |   | 1 | 100 | 65 |
|   |   | 0.5 | 100 | 48 |
| E | Natural d-trans-chrysanthemum monocarboxylic acid | 4 | 100 | 68 |
|   |   | 2 | 100 | 39 |
|   |   | 1 | 98 | 16 |
| F | Natural d-trans-chrysanthemum monocarboxylic acid | 16 | 100 | 67 |
|   |   | 8 | 100 | 45 |
|   |   | 4 | 97 | 27 |
| G | Natural d-trans-chrysanthemum monocarboxylic acid | 8 | 100 | 77 |
|   |   | 4 | 100 | 40 |
|   |   | 2 | 98 | 23 |
| B | dl-cis-chrysanthemum monocarboxylic acid | 8 | 100 | 75 |
|   |   | 4 | 100 | 40 |
|   |   | 2 | 100 | 28 |
| C | dl-cis-chrysanthemum monocarboxylic acid | 2 | 100 | 80 |
|   |   | 1 | 100 | 47 |
|   |   | 0.5 | 100 | 34 |
| B | dl-trans-chrysanthemum monocarboxylic acid | 8 | 100 | 70 |
|   |   | 4 | 100 | 54 |
|   |   | 2 | 100 | 29 |
| C | dl-trans-chrysanthemum monocarboxylic acid | 2 | 100 | 81 |
|   |   | 1 | 100 | 58 |
|   |   | 0.5 | 100 | 26 |
| Standard–Natural pyrethrins in refined kerosene |  | 3.66 | 100 | 66:71:71 |
|   |   | 1.83 | 100 | 44:47:55 |
|   |   | 0.92 | 100 | 24:29:33 |

[1] See Table V for the cyclopentenolones of Formula II used.
[2] The solvent was refined kerosene and tests were made by the turntable method [Campbell and Sullivan, Soap 14 (6): 119 (1938)].

TABLE VIII

Tests of Aerosol Formulations on Houseflies at a Dosage of 4.63 G./1000 Cu. Ft. Average of 4 Tests.

| Sample No. | Material | Concentration Per Cent | Per Cent Knockdown in minutes | | | Per Cent Kill in one day |
|---|---|---|---|---|---|---|
|   |   |   | 5 | 10 | 15 |   |
| G-580 | Ester A | 1 | 81 | 95 | 99 | 79 |
|   | Methylene chloride | 10 |   |   |   |   |
|   | Freon-12 | 89 |   |   |   |   |
| G-581 | Ester M | 1 | 51 | 80 | 93 | 45 |
|   | Methylene chloride | 10 |   |   |   |   |
|   | Freon-12 | 89 |   |   |   |   |
| G-583 | 20% Pyrethrum extract | 5 [1] | 65 | 83 | 90 | 49 |
|   | Methylene chloride | 6 |   |   |   |   |
|   | Freon-12 | 89 |   |   |   |   |

[1] Pyrethrins 1%.

TABLE IX

TESTS OF AEROSOL FORMULATIONS ON HOUSEFLIES AT A DOSAGE OF 1.16 G./1000 CU. FT. AVERAGE OF 3 TESTS.

| Sample No. | Material | Concentration Per Cent | Per Cent Knockdown in minutes | | | Per Cent Kill in one day |
|---|---|---|---|---|---|---|
| | | | 5 | 10 | 15 | |
| G-587 | Ester A | 0.4 | 61 | 72 | 85 | 93 |
| | DDT | 3 | | | | |
| | Lubricating oil | 5 | | | | |
| | Cyclohexanone | 5 | | | | |
| | Deobase | 1.6 | | | | |
| | Freon-12 | 85 | | | | |
| G-588 | Ester M | 0.4 | 55 | 73 | 85 | 94 |
| | DDT | 3 | | | | |
| | Lubricating oil | 5 | | | | |
| | Cyclohexanone | 5 | | | | |
| | Deobase | 1.6 | | | | |
| | Freon-12 | 85 | | | | |
| G-586 | Pyrethrins (purified) | 0.4 | 16 | 37 | 52 | 88 |
| | DDT | 3 | | | | |
| | Lubricating oil | 5 | | | | |
| | Cyclohexanone | 5 | | | | |
| | Deobase | 1.6 | | | | |
| | Freon-12 | 85 | | | | |
| G-179 | Pyrethrins [1] | 0.4 | 20 | 44 | 61 | 93 |
| | DDT | 3 | | | | |
| | Lubricating oil | 5 | | | | |
| | Cyclohexanone | 5 | | | | |
| | Freon-12 | 85 | | | | |

[1] 2% of a 20% pyrethrum extract was used.

Although the primary object of this invention is the preparation of esters of synthetic cyclopentenolones having a high order of insecticidal toxicity and knockdown, it is within the scope of this invention to prepare esters of the new cyclopentenolones using acid anhydrides or acid chlorides of other acids such as formic, acetic, propionic, palmitic, stearic or other fatty acids, unsaturated aliphatic acids such as oleic acid, saturated or unsaturated cyclic or polycyclic acids, aromatic acids such as benzoic acid, substituted aromatic acids, heterocyclic acids, or substituted heterocyclic acids. The new cyclopentenolones and their esters are potentially useful as intermediates in the preparation of other compounds and in the preparation of insecticides, perfumes, detergents and wetting agents.

This application is in part a continuation of our application Serial No. 75,282, filed on February 8, 1949.

The following further processes and products have been developed.

Supplementing the information presented above in relation to the preparation of beta-keto esters:

3-chloro-2-buten-1-ol [1]

To a solution of 106 g. (1.0 mole) anhydrous sodium carbonate in 890 ml. of water containing 1 g. of hydroquinone was added 125 g. (1.0 mole) of 1,3-dichloro-2-butene. After refluxing for five hours with stirring, the reaction mixture was saturated with sodium chloride, cooled, and extracted several times with ether. The ether extracts were combined, dried over sodium sulfate, the solvent was removed, and the residue fractionated, yielding 82 g. (77%), B. P. 90–93° at 50 mm., $N_D^{25}$ 1.4650.

2-butyn-1-ol [1]

To a refluxing solution of 118 g. of 85% potassium hydroxide (1.79 moles) in 138 ml. of water, 171 g. (1.61 moles) of 3-chloro-2-buten-1-ol was added during a period of one-half hour. Stirring and refluxing were discontinued after two more hours. After standing overnight, the reaction mixture was saturated with carbon dioxide, heated to reflux temperature, cooled and extracted several times with ether. The ether extracts were combined, dried over sodium sulfate, the solvent distilled off and the residue fractionated yielding 83.7 g. (75%), B. P. 82–92° at 95 mm., $N_D^{25}$ 1.4529.

1-chloro-2-butyne

One hundred and two grams (1.46 moles) of 2-butyn-1-ol and 26 g. of pyridine were placed in a three-necked flask equipped with a mercury-sealed stirrer, thermometer, and dropping funnel. After cooling to −10°, 82 g. (0.60 mole) of phosphorous trichloride was slowly added during a period of one hour. A slurry of crystals formed which dissolved on warming to room temperature. The reaction mixture was warmed to about 90–100° for a short time, whereupon a reaction took place with the formation of two layers. The upper layer was separated in a separatory funnel, filtered through a plug of cotton which had been moistened with low-boiling petroleum ether and distilled, yielding 49.5 g., B. P. 104–106° and an additional 34.6 g., B. P. about 55° at 35 mm. These fractions were combined, dissolved in low-boiling petroleum ether, and then washed with ice water. After drying with $CaCl_2$, the solvent was removed and residue distilled, the purified product boiling at 104–106° (760 mm.), 71.5 g. (55% yield), $N_D^{25}$ 1.4570.

ALPHA-SUBSTITUTED ACETOACETIC ESTERS

2-acetyl-5-chloro-4-pentenoic acid, ethyl ester [ethyl alpha-(3-chloro-allyl) acetoacetate]

Forty-six grams (2.0 moles) of sodium was dissolved in 600 ml. of absolute ethanol. After cooling, 286 g. (2.2 moles) of ethyl acetoacetate was added with stirring, followed by 222 g. (2.0 moles) of 1,3-dichloro-1-propene. After standing sixteen hours at room temperature, the reaction mixture was refluxed for four hours with stirring and after being cooled was neutralized by the addition of a little acetic acid. The sodium chloride was filtered off and the filtrate submitted to vacuum distillation, yielding 267 g. (65%), B. P. 142–147° (20 mm.), $N_D^{25}$ 1.4600.

[1] Prepared by the method described by Hatch and Nesbitt. J. Am. Chem. Soc., 72, 727 (1950).

Anal. calcd. for $C_{19}H_{13}O_3Cl$: $OC_2H_5$, 22.0; Cl, 17.3. Found: $OC_2H_5$, 21.1; Cl, 16.9.

2-acetyl-4-chloro-4-pentenoic acid, ethyl ester [ethyl alpha-(2-chloro-allyl) acetoacetate]

This ester was prepared in the same manner employing 2,3-dichloro-1-propene to alkylate ethyl acetoacetate in 22.5% yield; B. P. 126–128° (20 mm.), $N_D^{25}$ 1.4558.

Anal. calcd. for $C_{19}H_{13}O_3Cl$: $OC_2H_5$, 22.0; Cl, 17.3. Found: $OC_2H_5$, 20.2; Cl, 18.4.

2-acetyl-5-chloro-4-hexenoic acid, ethyl ester [ethyl alpha-(3-chloro-2-butenyl) acetoacetate]

This ester was also prepared in the same manner employing 1,3-dichloro-2-butene to alkylate ethyl acetoacetate in 76% yield, B. P. 95–112° (0.5 mm.), $N_D^{25}$ 1.4613.

Anal. calcd. for $C_{20}H_{15}O_3Cl$: $OC_2H_5$, 20.6. Found: $OC_2H_5$, 20.0. A small portion was redistilled; B. P. 80–84° (0.05 mm.), $N_D^{25}$ 1.4605.

2-acetyl-4-hexynoic acid, ethyl ester [ethyl alpha-(2-butynyl) aceto-acetate]

This ester was prepared in the same manner employing 8.4 g. of sodium, 125 ml. of absolute ethanol, 50 g. (0.39 mole) of ethyl acetoacetate, and 31 g. (0.35 mole) of 1-chloro-2-butyne. The yield of product boiling at 128–138° (15 mm.), $N_D^{25}$ 1.4530, was 40.6 g. (64%).

Anal. calcd. for $C_{10}H_{14}O_3$: $OC_2H_5$, 24.7. Found: $OC_2H_5$, 24.6.

KETONES FOR PREPARATION OF ESTERS OF TABLE X

6-chloro-5-hexen-2-one

To an ice-cold solution of 100 g. of potassium hydroxide (85%) in 1.2 l. of water was added 247 g. (1.2 moles) of ethyl 2-acetyl-5-chloro-4-pentenoate with stirring. After standing in the refrigerator at about 5° for five days, sulfuric acid (1:1) was added until the solution was acid to Congo red paper. It was refluxed a short time until evolution of carbon dioxide ceased, then cooled, and extracted several times with ether. The ether extracts were combined, washed with dilute alkali, and with saturated salt solution, and then dried over sodium sulfate. The solvent was removed and the residue distilled yielding 115 g. (72%), B. P. 80–93° (17 mm.). A portion was redistilled to obtain a purer sample, B. P. 80–81° (17 mm.), $N_D^{25}$ 1.4540.

Anal. calcd. for $C_6H_9OCl$: Cl, 26.8. Found: Cl, 25.8.

Its semicarbazone melted at 123–124°.

Anal. calcd. for $C_7H_{12}OClN_3$: N, 22.1. Found: N, 21.1.

5-chloro-5-hexen-2-one

This ketone was prepared in the same manner from ethyl 2-acetyl-4-chloro-4-pentenoate in 37% yield; B. P. 72–82° at 17 mm., $N_D^{25}$ 1.4480.

Its semicarbazone melted at 139–140°.

Anal. calcd. for $C_7H_{12}OClN_3$: N, 22.1. Found: N, 21.9.

6-chloro-5-hepten-2-one

This ketone was also prepared in the same manner employing 50 g. of sodium hydroxide dissolved in 330 ml. of water and 244 g. (1.12 moles) of ethyl 2-acetyl-5-chloro-4-hexenoate. The yield was 137 g. (83%), B. P. 88–90° at 15 mm., $N_D^{25}$ 1.4571.

Anal. calcd. for $C_7H_{11}OCl$: Cl, 24.2. Found: Cl, 23.6.

Its semicarbazone melted at 137–138°.

Anal. calcd. for $C_8H_{14}OClN_3$: Cl, 17.4. Found: Cl, 17.0.

5-heptyn-2-one

This ketone was prepared in the same manner employing 15.3 g. of 85% potassium hydroxide dissolved in 150 ml. of water and 40.6 g. (0.22 mole) of ethyl 2-acetyl-4-hexynoate. The yield was 17 g. (69%), B. P. 75–77° at 18 mm., $N_D^{25}$ 1.4472.

Anal. Calcd. for $C_7H_{10}O$: C, 76.32; H, 9.15. Found: C, 74.97, 74.90, 75.03; H, 8.94, 9.06.

Its semicarbazone melted at 175–176°.

Anal. calcd. for $C_8H_{13}ON_3$: C, 57.46; H. 7.84. Found: C, 57.14; H, 7.85.

GAMMA-SUBSTITUTED ACETOACETIC ESTERS

The beta-keto esters listed in Table X were prepared employing the general procedures described by Soloway and La Forge, J. Am. Chem. Soc. 69, 2677 (1947); Green and La Forge, J. Am. Chem. Soc. 70, 2287 (1948); and Schechter, Green, and La Forge, J. Am. Chem. Soc. 71, 1517, 3165 (1949), which involve the carbethoxylation of the ketones by reaction with ethyl carbonate employing sodium hydride as condensing agent, except for compound E which was prepared as follows:

2-allyl-3-oxo-6-heptenoic acid, ethyl ester

Six and four-tenths grams of sodium was dissolved in 170 ml. of absolute ethanol, the solution was cooled, and 50 g. (0.29 mole) of ethyl 3-oxo-6-heptenoate[1] added during five minutes

[1] Schechter, Green, and La Forge, J. Am. Chem. Soc. 71, 3165 (1949).

followed by the addition of 24 g. (0.31 mole) of allyl chloride with stirring. After standing overnight, the reaction mixture was refluxed for four hours with stirring. The sodium chloride was filtered off and the filtrate was submitted to distillation, the alcohol being removed as a fore-run. The physical constants of the product are given in Table X.

TABLE X

BETA-KETO ESTERS

| Beta-Keto Ester | Yield Percent | Boiling Point | | $N_D^{25}$ | Formula | Analyses | | | |
|---|---|---|---|---|---|---|---|---|---|
| | | | | | | Calcd. | | Found | |
| | | °C | mm. | | | Percent $OC_2H_5$ | Percent Cl | Percent $OC_2H_5$ | Percent Cl |
| A. Ethyl 7-chloro-3-oxo-6-heptenoate | 76 | 90–100 | 0.2 | 1.4640 | $C_9H_{13}O_3Cl$ | 22.0 | 17.3 | 21.3 | 17.7 |
| B. Ethyl 6-chloro-3-oxo-6-heptenoate | 27.5 | 85–95 | 0.2 | 1.4618 | $C_9H_{13}O_3Cl$ | 20.6 | 16.2 | 20.7 | 15.7 |
| C. Ethyl 7-chloro-3-oxo-6-octenoate | 71 | 87–90 | 0.15 | 1.4642 | $C_{10}H_{15}O_3Cl$ | 24.7 | | 25.4 | |
| D. Ethyl 3-oxo-6-octynoate | 63 | 77–83 | 0.1 | 1.4578 | $C_{10}H_{14}O_3$ | 21.4 | | 21.4 | |
| E. Ethyl 2-allyl-3-oxo-6-heptenoate | 75 | 130–137 | 18 | 1.4516 | $C_{12}H_{18}O_3$ | | | | |

HYDROXYDIKETONES

The following is an example of the general procedure used for preparing the hydroxydiketones from the beta-keto esters of Table X, particularly.

8-chloro-3-hydroxy-8-nonen-2,5-dione

Sixteen grams of ethyl 6-chloro-3-oxo-6-heptenoate (0.078 mole) was dissolved in 50 ml. of ice-cold potassium hydroxide solution (5.9 g. of 85% potassium hydroxide per 50 ml. of solution). After standing four days at 5° C., the solution was saturated with carbon dioxide. Fifteen grams of pyruvaldehyde diisopropyl acetal (0.086 mole) was refluxed with 15 ml. of 2% sulfuric acid with stirring until homogeneous and then twenty minutes more (about two hours total) after which the solution was cooled in an ice bath, neutralized by the careful addition of sodium bicarbonate and then added to the solution of saponified ester described above. After standing for one day at room temperature, the reaction mixture was extracted with ether, the ether extract was washed with saturated salt solution, dried over anhydrous sodium sulfate and the solvent removed. Distillation in high vacuum yielded 7.6 g. (48%) of product, B. P. 110–114° (0.2 mm.), $N_D^{25}$ 1.4853.

9-chloro-3-hydroxy-8-nonen-2,5-dione

This hydroxydiketone was prepared in the same manner as described above. From 40.9 g. of ethyl 7-chloro-3-oxo-6-heptenoate there was obtained 31.5 g. of crude product. Distillation of a few grams of this gave a pale yellow distillate, B. P. 113–776° at 0.2 mm., $N_D^{25}$ 1.4905 which, however, darkened and polymerized in a few hours. Hence, the crude product was employed for cyclization to the cyclopentenolone as described later.

9-chloro-3-hydroxy-8-decen-2,5-dione

This compound was prepared in the same manner from 40 g. (0.18 mole) of ethyl 7-chloro-3-oxo-6-octenoate and 35.1 g. (0.20 mole) of pyruvaldehyde diisopropyl acetal (hydrolyzed by refluxing with an equal weight of 2% sulfuric acid sollution). The yield was 25.8 g. (64.5%), B. P. 134–137° at 0.5 mm., $N_D^{25}$ 1.4873. A middle cut used for analysis had $N_D^{25}$ 1.4894.

Anal. calcd. for $C_{10}H_{15}O_2Cl$: Cl, 16.2. Found: Cl, 16.3.

4-allyl-3-hydroxy-8-nonen-2,5-dione

This compound was prepared by the general procedure for hydroxydiketones described above from 21.0 g. (0.1 mole) of ethyl 2-allyl-3-oxo-6-heptenoate. After saponification with aqueous alkali in the refrigerator for several days, 5.5 g. of oil which was floating on the surface was removed. This oil may have contained some unsaponified ester and some ethyl 2,2-diallyl-3-oxo-6-heptenoate. After removal of the oil, the alkaline solution was neutralized with carbon dioxide and mixed with pyruvaldehyde obtained by the acid hydrolysis and subsequent neutralization of 14.2 g. (0.082 mole) of pyruvaldehyde diisopropyl acetal. Working up the reaction mixture in the usual manner gave 4.6 g. (30% yield on the basis of 15.5 g. of ethyl 2-allyl-3-oxo-6-heptenoate actually utilized) of product, B. P. 110–120° (0.2 mm.), $N_D^{25}$ 1.4790.

3-hydroxy-8-decyn-2,5-dione

This compound was prepared by the general procedure for hydroxydiketones described above from 17.9 g. (0.098 mole) of ethyl 6-octynoate and 19.0 g. (1.09 moles) of pyruvaldehyde diisopropyl acetal (hydrolyzed by refluxing with an equal weight of 2% sulfuric acid solution). The yield was 11.5 g. (64.5%), B. P. 110–115° (0.1 mm.), $N_D^{25}$ 1.4812.

Anal. calcd. for $C_{10}H_{14}O_3$: C, 65.91; H, 7.74. Found: C, 65.63; H, 7.76.

Its anhydrodisemicarbazone recrystallized from acetic acid melted at 226–227° (dec.).

CYCLOPENTENOLONES

Another and improved procedure for cyclizing the hydroxydiketones is as follows:

The hydroxydiketone, either pure or crude and undistilled, is slowly dropped, during a period of about one hour, with stirring, into a cold (about 10° C.) solution of about ten to fifteen volumes of 2% sodium hydroxide solution containing a small amount of hydroquinone, the air in the vessel having first been displaced by nitrogen. After stirring for about another hour and a half to two hours at room temperature, the solution is saturated with sodium chloride and extracted several times with ether. The ether extracts are combined, washed several times with saturated sodium chloride solution and dried over anhydrous sodium sulfate, after which the solvent is removed and the cyclopentenolone distilled in high vacuum.

2-(2-chloroallyl)-4-hydroxy-3-methyl-2-cyclopenten-1-one

Seven grams of 8-chloro-3-hydroxy-8-nonene-2,5-dione was cyclized by agitation with 2% sodium hydroxide solution employing the improved procedure described above. The yield of product boiling at 120–125° (0.2 mm.) was 4.15 g. (22%), $N_D^{25}$ 1.5297.

Anal. calcd. for $C_9H_{11}O_2Cl$: Cl, 19.0. Found: Cl, 18.6.

Its semicarbazone melted at 214–214.5° (dec.).

2-(3-chloroallyl)-4-hydroxy-3-methyl-2-cyclopenten-1-one

This compound was prepared by the cyclization of 28 g. of crude 9-chloro-3-hydroxy-8-nonen-2,5-dione by the improved procedure. There was obtained 11 g. of product, B. P. 136–138° at 0.1 mm., $N_D^{25}$ 1.5342.

Anal. calcd. for $C_9H_{11}O_2Cl$: C, 57.92; H, 5.94; Cl, 19.00. Found: C, 58.10; H, 5.82; Cl, 18.86.

Its semicarbazone melted at 204–205° (dec.).

2-(3-chloro-2-butenyl)-4-hydroxy-3-methyl-2-cyclopenten-1-one

This cyclopentenolone was prepared in the manner described above by cyclizing 24.2 g. of 9-chloro-3-hydroxy-8-decen-2,5-dione. The yield of product, B. P. 130–142° at 0.2 mm., $N_D^{25}$ 1.5210 was 9.6 g. (43%). Because the distillate had an acidic reaction, it was dissolved in ether and washed with sodium bicarbonate solution. After drying over anhydrous sodium sulfate, the solvent was removed and the residue distilled, B. P. 135–139° at 0.2 mm., $N_D^{25}$ 1.5267.

Anal. calcd. for $C_{10}H_{13}O_2Cl$: C, 59.85; H, 6.53; Cl, 17.67. Found: C, 57.90; H, 6.18; Cl, 17.39.

Its semicarbazone melted at 220–221° (dec.).

2,5-diallyl-4-hydroxy-3-methyl-2-cyclopenten-1-one

This compound was obtained by cyclization of 4.6 g. of 4-allyl-3-hydroxy-8-nonene-2,5-dione by agitation in a nitrogen atmosphere for two hours with 50 ml. of 2% sodium hydroxide solution containing a small amount of hydroquinone. The yield of product, B. P. 112–114° (0.1 mm.), $N_D^{25}$ 1.5114, was 2.2 g. (52%).

Anal. calcd. for $C_{12}H_{16}O_2$: C, 74.97; H, 8.39. Found: C, 73.34; H, 8.14.

Its semicarbazone melted at 226–227° (dec.). Anal. calcd. for $C_{13}H_{19}O_2N_3$: C, 62.63; H, 7.68. Found: C, 62.41; H, 7.76.

2-(2-butynyl)-4-hydroxy-3-methyl-2-cyclopenten-1-one

This cyclopentenolone was prepared by the improved procedure described for the other compounds of this type. From 10.7 g. (0.059 mole) of 3-hydroxy-8-decyn-2,5-dione there was obtained 6.15 g. (63.8%) of product, B. P. 124–129° at 0.1 mm., $N_D^{25}$ 1.5160. After purification by regeneration from the semicarbazone, it boiled at 125–127° (0.15 mm.), $N_D^{25}$ 1.5302.

Anal. calcd. for $C_{10}H_{12}O_2$: C, 73.14; H, 7.37. Found: C, 71.85; H, 7.39.

Its semicarbazone melted at 245–246° (dec.). Anal. calcd. for $C_{11}H_{17}O_2N_3$: N, 18.82. Found: N, 18.87.

Cis-2-(2-butenyl)-4-hydroxy-3-methyl-2-cyclopenten-1-one (synthetic dl-cis-cinerolone)

To 2.4 g. of palladium-calcium carbonate catalyst, 0.8 ml. of quinoline was added, followed by 12 ml. of ethyl acetate. The catalyst was then reduced with hydrogen at atmospheric pressure in a catalytic hydrogenation apparatus. An ethyl acetate solution of 9.45 g. of 2-(2-butynyl)-4-hydroxy-3-methyl-2-cyclopenten-1-one was added and the hydrogenation continued until one molecular equivalent of hydrogen was absorbed. The total time required was about a half hour, the hydrogenation being about 95% complete in the first fifteen minutes. The solution was then filtered, the solvent removed and the residue converted to the semicarbazone in ethanol-pyridine-water solution. The next day, the semicarbazone was filtered off, washed with water and with cold ethanol, and then dried to yield 9.55 g. of the semicarbazone derivative of synthetic dl-cis-cinerolone, M. P. 202–203° (dec.). Pure dl-cis-cinerolone can be obtained by regeneration from the semicarbazone. (Note that the compound B of Table VI is the dl-trans compound, the double bond in the butenyl side chain being trans.)

Preparation of Cyclopropane Carboxylic Acids and Acid Chlorides

The general procedure used was as follows:

One gram of copper powder is placed in a flask with 0.5 mole of the unsaturated hydrocarbon and heated to the reflux temperature. The source of heat is removed and 0.25 mole of ethyl diazoacetate added slowly at such a rate that gentle refluxing is maintained. The reaction is exothermic and it is not usually necessary to use external heating to maintain refluxing. Nitrogen is evolved during the addition of the ethyl diazoacetate. The excess hydrocarbon is recovered by distillation in the case of the lower boiling ones and by vacuum distillation in the case of the higher boiling ones. The ethyl ester of the desired acid is then vacuum-distilled.

The ethyl ester of the cyclopropane carboxylic acid is saponified by refluxing several hours with an excess of potassium hydroxide or sodium hydroxide in 50% ethanol. The solution is then evaporated until most of the ethanol has been removed after which it is extracted with ether to remove impurities. The aqueous solution is then acidified to Congo red paper with mineral acid and extracted with ether. The ether solution is washed, dried over anhydrous sodium sulfate and the solvent removed. The cyclopropane carboxylic acid is then obtained by vacuum distillation.

The cyclopropane carboxylic acid chlorides are prepared by mixing the acid with a 50% excess of thionyl chloride dissolved in two to three volumes of low-boiling petroleum ether and allowing to stand overnight at room temperature in a flask equipped with a reflux condenser protected by a drying tube. The solvent and excess reagent are distilled off and the acid chloride obtained by vacuum distillation.

The acids and acid chlorides thus prepared are listed in Table XI.

Cyclopropanecarboxylic acid itself was obtained by the oxidation of methyl cyclopropyl ketone with sodium hypochlorite solution in 94% yield, B. P. 80–83° (15 mm.), $n_D^{25}$ 1.4366. Its acid chloride boiled at 47–50° (50 mm.).

2,2-dimethyl-3-nitrocyclopropanecarboxylic acid, M. P. 120.5–121°, was employed.

Preparation of Esters

The esters were prepared in the following general manner:

The cyclopentenolone is dissolved in absolute benzene containing a molecular excess of absolute pyridine (usually about 50% excess over the theoretical amount). To this solution, a molecular equivalent or slight excess (about 2% but not exceeding about 5% excess over the amount required to acylate the cyclopentenolone) of the acid chloride dissolved in absolute benzene is then added. In the case of amounts larger than about 0.2 of a mole, it is desirable to cool each solution before mixing, or to add the benzene solution of the acid chloride slowly while the other solution is stirred with cooling in a cold water bath. The reaction mixture is allowed to stand about one or two days in a stoppered flask at room temperature. The next step consists in filtering off the pyridine hydrochloride and washing it with benzene after which the filtrate and washings are combined; alternatively, particularly with small-scale runs, the reaction mixture may be poured into a separatory funnel and washed with portions of water until the pyridine hydrochloride is removed. In either case, the resulting benzene solution is washed in a separatory funnel successively with water, with dilute hydrochloric acid until the pyridine is removed, then again with water, then with dilute sodium bicarbonate solution until the acidic compounds are removed and finally with saturated salt solution. The benzene solution is then dried over anhydrous sodium sulfate and the solvent removed preferably by vacuum distillation in order not to heat the esters any more than is necessary. To remove the benzene more completely, a vacuum of about 15 mm. is finally applied for fifteen to thirty minutes while heating the ester to 50–60° and a high vacuum may then be applied until the pressure, as indicated on a suitable gauge, has dropped to 0.5 mm. or less.

The above procedure is usually satisfactory in most cases and was used for all of the esters described herein except for the acetates which were prepared by mixing the cyclopentenolone with about two molecular equivalents of acetic anhydride and a small amount of anhydrous sodium acetate. The next day, after warming on a steam bath for about a half hour, the excess acetic anhydride was removed by vacuum distillation, the residue was dissolved in ether, washed with water and the solution dried over anhydrous sodium sulfate, after which the solvent was removed and the cyclopentenolone acetate distilled in high vacuum.

Additional variations of methods of acylating cyclopentenolones are given by Staudinger and Ruzicka, Helv. Chim. Act, 7, 448–458 (1924).

clopenten-1-one with the following acids were prepared:

(1) 2-(1 - methylvinyl) cyclopropanecarboxylic acid and/or 2-methyl-2-vinylcyclopropanecarboxylic acid.

(2) 2-methyl-2-(1 - methylvinyl) cyclopropanecarboxylic acid.

(3) 3 - isobutyl - 2,2 - dimethylcyclopropanecarboxylic acid (dihydrochrysanthemum monocarboxylic acid).

(4) 2 - methyl - 2 - (3 - methyl - 3 - butenyl) - cyclopropanecarboxylic acid.

TABLE XI
Cyclopropane Carboxylic Acids and Acid Chlorides
*Cyclopropane carboxylic acid*

| Hydrocarbon used | Cyclopropane carboxylic acid, ethyl ester | | | | Acid | | | Acid Chloride | |
|---|---|---|---|---|---|---|---|---|---|
| | Name | B. P. °C. | (mm.) | $n_D^{25}$ | B. P. °C. | (mm.) | $n_D^{25}$ | B. P. °C. | (mm.) |
| 2-Methyl-1,3-butadiene (isoprene) | 2-(1-methylvinyl)-and/or 2-methyl-2-vinyl- | 73–75 | (16.5) | 1.4480 | 116–118 | (15) | [1] 1.4712 | 62–66 | (15) |
| 2,3-Dimethyl-1,3-butadiene | 2-methyl-2-(1-methylvinyl)- | 80–90 | (17) | 1.4450 | 122–123 | (15) | [1] 1.4648 | 75–85 | (15) |
| 2,5-Dimethyl-2-hexene | 3-isobutyl-2,2-dimethyl- | 100–103 | (16) | 1.4347 | 141–143 | (20) | [1] 1.4490 | 94–96 | (15) |
| 2,5-Dimethyl-1,5-hexadiene | 2-methyl-2(3-methyl-3-butenyl)- | 110–115 | (15) |  | 145–146 | (15) | 1.4650 | 102–106 | (15) |
| 2,5-Dimethyl-2,4-hexadiene | 2,2-dimethyl-3-(1-methylpropenyl)-and/or 2,3-dimethyl-3-(2-methylpropenyl)- | 95–105 | (14) | 1.4490 | 140–143 | (15) | [1] 1.4695 | 90–95 | (15) |
| 2,5-Dimethyl-2,4-hexadiene | cis+trans-chrysanthemum monocarboxylic acids. | 105–113 | (16) | 1.4599 | 143–145 | (15) | [1] 1.4731 | 98–99 | (14) |
| 1,3-Pentadiene | 2-propenyl- and/or 2-methyl-3-vinyl- | 80–83 | (14) |  | 125–128 | (15) | 1.4768 | 70–71 | (14) |
| 2,4,4-Trimethyl-1-pentene | 2-methyl-2-(2,2-dimethylpropyl)- | 98–101 | (15) | 1.4380 | 139–141 | (15) | 1.4535 | 94–95 | (14) |

[1] See Staudinger and Ruzicka, Helv. Chim. Acta, 7, 448–458 (1924), who also prepared these acids.

METHODS OF PURIFICATION OF THE ESTERS

In general, the crude esters left after removal of the benzene used as a solvent in their preparation are pure enough for most insecticidal applications. However, the following simple procedure considerably improved the color and odor of the product.

A concentrated solution (about 50%) of the ester in benzene is filtered through a column of active charcoal and then through a column of adsorbent clay such as Attapulgus clay mixed with a diatomaceous filter-aid to increase the speed of filtration. The charcoal and adsorbent clay may be packed into the same column one above the other and the filtration hastened by the application of pressure at the top or vacuum at the bottom of the column. After washing the column with a little benzene (the use of too much will start to elute the adsorbed impurities), the filtrates are combined and the solvent is removed with the final application of high vacuum as described above. One lot of synthetic dl-2-allyl - 4 - hydroxy-3-methyl-2-cyclopenten-1-one ester with a mixture of dl-cis- and trans-chrysanthemum monocarboxylic acids (hereinafter occasionally referred to as the synthetic allyl homolog of cinerin I) when so purified had $n_D^{25}$ 1.5051, $d_4^{25}$ 1.0057.

Another method of purification is distillation in a high vacuum. One lot of the synthetic allyl homolog of cinerin I was found to distill at 135–138° at 0.25 mm., and had $n_D^{25}$ 1.5054, $d_4^{25}$ 1.0073. A small fore-run and residue were discarded. Distillation in a molecular still employing a very high vacuum is even more advantageous with regard to purification with decreased chances for bad effects due to oxidation or thermal decomposition and is to be particularly recommended for the distillation of large batches.

Esters of dl-2-allyl-4-hydroxy-3-methyl-2-cy- (5) 2,2 - dimethyl - 3 - (1 - methylpropenyl) - cyclopropanecarboxylic acid and/or 2,3-dimethyl-3 - (2 - methylpropenyl) cyclopropanecarboxylic acid.

(6) Chrysanthemum monocarboxylic acid, synthetic dl-cis-trans mixture (for physical constants of this ester see under "Methods of Purification of the Esters").

(7) 2 - propenylcyclopropanecarboxylic acid and/or 2 - methyl-3-vinylcyclopropanecarboxylic acid.

(8) 2 - methyl - 2 - (2,2 - dimethylpropyl) cyclopropanecarboxylic acid.

(9) d-trans - chrysanthemum monocarboxylic acid (natural). The ester boiled at 135–138° (0.25 mm.), $n_D^{25}$ 1.5035.

(10) dl-cis - chrysanthemum monocarboxylic acid.

(11) dl - trans - chrysanthemum monocarboxylic acid.

(12) 1 - trans - chrysanthemum monocarboxylic acid.

(13) Natural chrysanthemum dicarboxylic acid monomethyl ester.

(14) Acetic acid. The ester boiled at 96–100° (0.3 mm.), $n_D^{25}$ 1.4900.

(15) Chloroacetic acid.

(16) Cinnamic acid.

(17) p-Chlorobenzoic acid.

(18) p-Toluene sulfonic acid.

(19) Sorbic acid.

(20) 2-furanacrylic acid.

(21) Anisic acid.

(22) Senecioic acid.

(23) Furoic acid.

(24) 3,5-dinitrobenzoic acid. The ester melted at 129–130°.

(25) 2,2 - dimethyl - 3 - nitrocyclopropanecarboxylic acid.

The following compounds were converted to esters of synthetic chrysanthemum monocarboxylic acid, dl-cis-trans mixture.

(26) 2-(2 - chloroallyl) - 4 - hydroxy-3-methyl-2-cyclopenten-1-one.

(27) 2-(3 - chloroallyl) - 4 - hydroxy-3-methyl-2-cyclopenten-1-one.

(28) 2 - (3 - chloro - 2 - butenyl) - 4 - hydroxy-3-methyl-2-cyclopenten-1-one.

(29) 2 - (2 - butnyl) - 4 - hydroxy - 3 - methyl-2-cyclopenten-1-one. The ester had $n_D^{25}$ 1.5134.

(30) 2,5 - diallyl - 4 - hydroxy - 3 - methyl-2-cyclopenten-1-one.

The 3,5-dinitrobenzoate of 2-butyl-4-hydroxy-3-methyl-2-cyclopenten-1-one was prepared, M. P. 111.5–112°.

In the case of esters marked 1, 5, and 7, the acids used were one or the other of the two acids named or their mixture.

The d-trans-chrysanthemum monocarboxylic acid (natural acid) ester of 2-allyl-4-hydroxy-3-methyl-2-cyclopenten-1-one (of Table VII) was determined to have $n_D^{25}$ 1.5023 undistilled and 1.5035 distilled. The ester of the same acid was 4 - hydroxy-3-methyl-2-(2-methylallyl)-2-cyclopenten-1-one had the refractive index $n_D^{25}$ 1.5017. The ester of this acid with the synthetic 2 - (2 - butenyl) - 4 - hydroxy - 3 - methyl - 2-cyclopenten-1-one had the index $n_D^{25}$ 1.5070.

Tests on houseflies, in comparison with pyrethrins, showed that some of the esters of Table VII and the esters marked 3, 6, 9, 10, 11, 26, 27, 29, and 30 have significant relative toxicity.

Having thus described our invention, we claim:

1. A cyclopropane carboxylic acid ester of 2-allyl-4-hydroxy-3-methyl-2-cyclopenten-1-one.

2. The mixture of synthetic dl-cis- and dl-trans-chrysanthemum monocarboxylic acid esters of 2-allyl-4-hydroxy-3-methyl-2-cyclopenten-1-one.

3. A chrysanthemum monocarboxylic acid ester of 2-allyl-4-hydroxy-3-methyl-2-cyclopenten-1-one, the chrysanthemum acid being at least in part d-trans-chrysanthemum monocarboxylic acid.

4. The process of preparing an insecticidally active analogue of pyrethrin comprising acylating 2-allyl-4-hydroxy-3-methyl-2-cyclopenten-1-one with a chrysanthemum monocarboxylic acid acylating agent.

5. The process of claim 4 in which the acylating agent is a mixture of dl-cis and dl-trans chrysanthemum monocarboxylic acid chlorides.

6. The process of claim 4 in which the said agent is at least in part a d-chrysanthemum monocarboxylic acid acylating agent.

7. An ester of 2-allyl-4-hydroxy-3-methyl-2-cyclopenten-1-one with a chrysanthemum monocarboxylic acid.

MILTON S. SCHECHTER.
FREDERICK B. LA FORGE.

REFERENCES CITED

The following references are of record in the file of this patent:

Richter, Textbook of Organic Chemistry, pp. 323–324 (1938 edition), John Wiley and Sons, New York, N. Y.

Crombie et al., Nature, 162, 222–223 (1948).

Harper, Chem. and Ind. 37, 636–637 (1949).